United States Patent [19]

Okubo et al.

[11] Patent Number: 4,477,605

[45] Date of Patent: Oct. 16, 1984

[54] ASBESTOS-FREE FRICTION MATERIALS

[75] Inventors: Howard S. Okubo, Chicago; Clarence E. Albertson, Villa Park; Roger K. Nibert, Hoffman Estates, all of Ill.

[73] Assignee: Borg-Warner Corporation, Chicago, Ill.

[21] Appl. No.: 477,194

[22] Filed: Mar. 21, 1983

[51] Int. Cl.$^3$ .......................................... C08F 212/34
[52] U.S. Cl. .................................... 523/155; 428/283; 428/288; 428/290; 428/323; 428/426; 428/702; 523/156
[58] Field of Search .............. 188/251 A; 192/107 M; 428/283, 288, 323, 328, 330, 426, 538; 523/155, 156

[56] References Cited

U.S. PATENT DOCUMENTS

| | | | |
|---|---|---|---|
| 2,394,783 | 2/1946 | Keller et al. | 260/41 |
| 3,007,890 | 11/1961 | Twiss et al. | 260/38 |
| 3,494,884 | 2/1970 | Kraft | 260/39 |
| 3,725,334 | 4/1973 | Popp et al. | 260/38 |
| 4,197,223 | 4/1980 | Bartram | 188/251 A |
| 4,320,823 | 3/1982 | Covaleski | 188/251 A |

FOREIGN PATENT DOCUMENTS 2003088  3/1979  United Kingdom .

*Primary Examiner*—James J. Bell

[57] ABSTRACT

A pad-type friction material containing an inorganic fibrous material, a binder, zinc oxide and molybdenum sulfide. It contains no asbestos. The preferred fibrous material is wollastonite or a mixture of wollastonite and glass.

7 Claims, No Drawings

ASBESTOS-FREE FRICTION MATERIALS

This invention relates as indicated to asbestos-free friction materials. More particularly, it relates to such materials as are especially adapted for use in brake and clutch linings. Still more particularly, it relates to the use of these materials in dry, pad-type brake materials.

BACKGROUND OF THE INVENTION

It is well-known that friction materials which are intended for use in heavy duty brake or clutch operations in motor vehicles must withstand severe service conditions. In use they are subjected to rigorous treatment by repeated and prolonged braking or clutching applications which develop high temperatures, usually about 500° F., in the friction materials, these temperatures sometimes exceeding 1000° F. on the friction surface of the material and progressively decreasing inwardly of such surface. These high temperatures, especially when occurring during high speed stops or following repeated applications of the brakes or clutches, tend to decompose the organic material which acts as a binder in the friction material. Such decomposition results in the formation of gaseous or liquid products which in some cases cause loss of braking or clutching efficiency. Moreover, the weakened decomposed lining surface may wear faster, with resultant premature failure of these surfaces to perform their intended function.

In general, a friction material contains a matrix or binder, such as a thermosetting resin, a high-melting fibrous material, and various additives which contribute friction and/or wear properties and bulk. In the past the fibrous material has invariably been chrysotile asbestos. Asbestos fiber imparts strength to the friction material and, at the same time, has a beneficial effect on friction properties. Moreover, in the past, it has been relatively cheap.

However, asbestos deposits throughout the world are rapidly being depleted, with the result that its cost is increasing. Moreover, the continued use of asbestos has recently come under a cloud because of the realization that it presents a serious cancer hazard for those who work with it. There has been an increasing concern about such hazard with the result that the expense of health precautions now required for the safe handling of asbestos has become a significant burden. Accordingly, it has become desirable to eliminate asbestos from frictional material formulations and to find a replacement.

U.S. Pat. No. 2,394,783 (Keller et al.) shows a friction element containing a butadiene-acrylonitrile copolymer as a bonding agent. The two examples in this patent show such elements which also contain asbestos, zinc oxide and a phenol-formaldehyde resin. These compositions are said to be especially useful because they withstand severe usage and high temperatures without undergoing excessive thermal degradation and loss of friction qualities.

U.S. Pat. No. 3,007,890 (Twiss et al.) shows a heat-cured friction material containing a butadiene-acrylonitrile copolymer, less than 15% of a phenolformaldehyde resin and asbestos. Although asbestos is preferred, wollastonite is included in a list of "filamentous, particulate materials which may be used in its place." The friction materials may also contain zinc oxide and molybdenum sulfide.

U.S. Pat. No. 3,494,884 (Kraft) deals with a friction material which contains an intimate mixture of granules of a sintered metallic friction material, a filler and an organic binder. The sintered metallic material may include molybdenum disulfide; the filler may be glass wool; and the organic binder may be a phenol-formaldehyde resin.

U.S. Pat. No.3,725,334 (Popp et al.) teaches the stabilization of a phenolic resin by means of a particularly defined cross-linked polyisocyanurate. These stabilized resins are said to be useful in friction materials and a friction material is shown containing such a resin, zinc oxide, asbestos, molybdenum sulfide and an acrylonitrile-butadiene copolymer.

U.S. Pat. No. 3,832,325 (Eschen) relates to composition brake blocks comprising SBR or nitrile rubber plus a small proportion of zinc oxide, asbestos fiber, cast iron chips, a lead component, a thermosetting resin and sulfur.

U.K. Patent Application No.. 2,003,088 shows a disc brake pad the friction material of which may comprise a wide variety of ingredients including glass fibers, phenol-formaldehyde, an acrylonitrile rubber, zinc oxide and molybdenum sulfide.

SUMMARY OF THE INVENTION

The present invention is an asbestos-free, pad-type, friction material comprising in combination an inorganic fiber, a binder, from about 2 to about 20 parts of zinc oxide and from about 5 to about 25 parts of molybdenum sulfide. This friction material serves well both in clutch and brake applications; it has excellent friction properties, exhibiting a relatively high degree of coefficient of friction through a wide range of temperature and having good resistance to normal conditions of wear in such applications.

PREFERRED EMBODIMENTS

The inorganic fiber may be glass, basalt ceramic, fiberized slag, a polycrystalline refractory metal oxide or the like. Mixtures of these may be used. Siliceous fibers such as glass and wollastonite are preferred. An especially preferred fiber is wollastonite and mixtures of wollastonite and glass are especially preferred.

The amount of inorganic fiber which should be used in the friction materials of the invention ranges from about 10 to about 45 percent of the friction material.

The binder may be either or both of two types: (1) a phenolic resin or (2) a copolymer of acrylonitrile and butadiene. A combination of these two types is preferred. Any phenolic resin of the type ordinarily employed in the manufacture of friction elements can be used according to the present invention. An example of such a resin is one prepared by condensing equal molar proportions of formaldehyde and phenol using aqueous formic acid as a catalyst. The condensation reaction is continued until the product is a reversible, fusible thermoplastic material which is water-insoluble. It then is separated from the aqueous phase, comminuted and blended with hexamethylenetetramine and an amount sufficient to provide about one half mol of formaldehyde per mol of phenol in the condensate. However, phenol/aldehyde resins obtained from cresols, xylenols or furfuryl alcohol as all or part of the phenolic reactant, and furfural as all of part of the aldehyde reactant, may be employed.

Typical resins, curable to an insoluble, infusible thermoset state are generally suitable for use herein, including, for example, phenol/formaldehyde, phenol/furfural, aniline based resins such as aniline/formaldehyde, and phenol/aminoplast/formaldehyde.

The copolymer of acrylonitrile and butadiene generally will contain from about 20% to about 50% of acrylonitrile. Small proportions, i.e., from about 1% to about 5% of other monomers such as acrylic acid, methacrylic acid and itaconic acid may be present. Those acrylonitrile-butadiene copolymers which are polymerized to a highly cross-linked polymer state having a high gel fraction and a high molecular weight and which are substantially insoluble in organic solvents, are preferred. Nitrile rubbers, as these are ordinarily termed, are described more particularly in the Vanderbilt Rubber Handbook (1968), pp 99–118 (Nitrile Elastomers).

The amount of binder to be used in the friction material will vary within the range of from about 10 percent to about 40 percent of the friction material. Preferably, the binder is a mixture of a phenolic resin and a copolymer of acrylonitrile and butadiene, in which case the phenolic resin will constitute 25–80% of this mixture and the acrylonitrile-butadiene copolymer will comprise the remainder, i.e., 20–75%.

The amounts of zinc oxide and molybdenum sulfide which are to be used in the friction material herein are each within the range of from about 4 percent to about 20 percent of the friction material.

The friction materials of the invention are characterized by good friction properties as well as by good wear properties. These properties are shown by data obtained from tests carried out on a FAST machine.

A typical friction material of the invention contains the following components:

| Parts | Component |
| --- | --- |
| 11.2 | Nitrile Rubber |
| 12.9 | Phenolic Resin |
| 8.8 | Zinc Oxide |
| 9.4 | Coke Particles |
| 6.5 | Sulfur |
| 10.0 | Barytes |
| 29.4 | Wollastonite |
| 11.8 | Molybdenum Sulfide (50%) |

The above components were dry-blended, cured to a flat sheet and tested on a FAST machine (friction assessment standard testing maching made by the Bush Manufacturing Co.). The results showed it to have a good, stable (no fade) coefficient of friction and to be satisfactorily resistant to wear.

All parts and percentages herein are by weight based on the weight of the entire composition, unless otherwise clearly expressed.

We claim:

1. An asbestos-free, pad-type, friction material having good friction stability and wear properties consisting essentially of an inorganic fiber, a binder, from about 5 to about 20 parts of zinc oxide and from about 5 to about 25 parts of molybdenum sulfide.

2. The friction material of claim 1 wherein the inorganic fiber is wollastonite fiber.

3. The friction material of claim 1 wherein the binder is a mixture of two or more binders.

4. The friction material of claim 1 wherein one of the binders is a phenolic resin.

5. The friction material of claim 1 wherein the binder is a combination of a phenolic resin and a copolymer of butadiene and acrylonitrile.

6. An asbestos-free, pad-type, friction material having good friction stability and wear properties consisting essentially of wollastonite fiber, a phenolic resin, from about 2 to about 10 parts of antimony sulfide and from about 5 to about 25 parts of molybdenum sulfide.

7. The friction material of claim 6 wherein it additionally contains from about 2 to about 20% of glass fibers.

* * * * *